(12) United States Patent
Mou et al.

(10) Patent No.: US 11,945,282 B2
(45) Date of Patent: Apr. 2, 2024

(54) GAS DETECTION AND CLEANING SYSTEM FOR VEHICLE

(71) Applicant: Microjet Technology Co., Ltd., Hsinchu (TW)

(72) Inventors: Hao-Jan Mou, Hsinchu (TW); Yung-Lung Han, Hsinchu (TW); Chi-Feng Huang, Hsinchu (TW); Chin-Wen Hsieh, Hsinchu (TW); Tsung-I Lin, Hsinchu (TW); Yang Ku, Hsinchu (TW); Yi-Ting Lu, Hsinchu (TW)

(73) Assignee: MICROJET TECHNOLOGY CO., LTD., Hsinchu (TW)

(*) Notice: Subject to any disclaimer, the term of this patent is extended or adjusted under 35 U.S.C. 154(b) by 614 days.

(21) Appl. No.: 17/158,855

(22) Filed: Jan. 26, 2021

(65) Prior Publication Data
US 2021/0245570 A1 Aug. 12, 2021

(30) Foreign Application Priority Data
Feb. 6, 2020 (TW) .................. 109103770

(51) Int. Cl.
*B60H 1/00* (2006.01)
*B60H 3/06* (2006.01)
(Continued)

(52) U.S. Cl.
CPC ......... *B60H 1/008* (2013.01); *B60H 1/00264* (2013.01); *B60H 1/00428* (2013.01);
(Continued)

(58) Field of Classification Search
CPC .............. B60H 1/008; B60H 1/00264; B60H 1/00428; B60H 3/06; G01N 15/0211; G01N 2015/0046; F01N 2560/05; F01N 13/008
See application file for complete search history.

(56) References Cited

U.S. PATENT DOCUMENTS 5,218,347 A 6/1993 Deppe
6,773,477 B2 * 8/2004 Lindsay .................. B01D 46/10
55/385.3
(Continued)

FOREIGN PATENT DOCUMENTS

CN 1427746 A 7/2003
CN 206690842 U * 12/2017 ............... B60H 3/00
(Continued)

*Primary Examiner* — Edmond C Lau
*Assistant Examiner* — Joshua M Carlson
(74) *Attorney, Agent, or Firm* — Birch, Stewart, Kolasch & Birch, LLP

(57) ABSTRACT

A gas detection and cleaning system for a vehicle is disclosed and includes an external modular base, a gas detection module and a cleaning device. The gas detection module is connected to a first external connection port of the external modular base to detect a gas in the vehicle and output the information datum. The information datum is transmitted through the first external connection port to a driving and controlling module of the external modular base, processed and converted into an actuation information datum for being externally outputted through a second external connection port of the external modular base. The cleaning device is connected with the second external connection port through an external port to receive the actuation information datum outputted from the second external connection port to actuate or close the cleaning device.

13 Claims, 22 Drawing Sheets

(51) Int. Cl.
*G01N 15/00* (2006.01)
*G01N 15/02* (2006.01)
*G01N 15/0205* (2024.01)

(52) U.S. Cl.
CPC ....... B60H 3/06 (2013.01); *G01N 2015/0046* (2013.01); *G01N 15/0211* (2013.01)

(56) References Cited

U.S. PATENT DOCUMENTS

| | | | | |
|---|---|---|---|---|
| 9,213,327 | B1 * | 12/2015 | Gettings | H04M 1/72454 |
| 2019/0056766 | A1 | 2/2019 | Mou et al. | |

FOREIGN PATENT DOCUMENTS

| | | |
|---|---|---|
| CN | 110609114 A | 12/2019 |
| EP | 2 276 582 B1 | 9/2019 |
| TW | M483193 U | 8/2014 |
| TW | M513135 U | 12/2015 |
| TW | M561788 U | 6/2018 |
| WO | WO 01/66258 A1 | 9/2001 |

\* cited by examiner

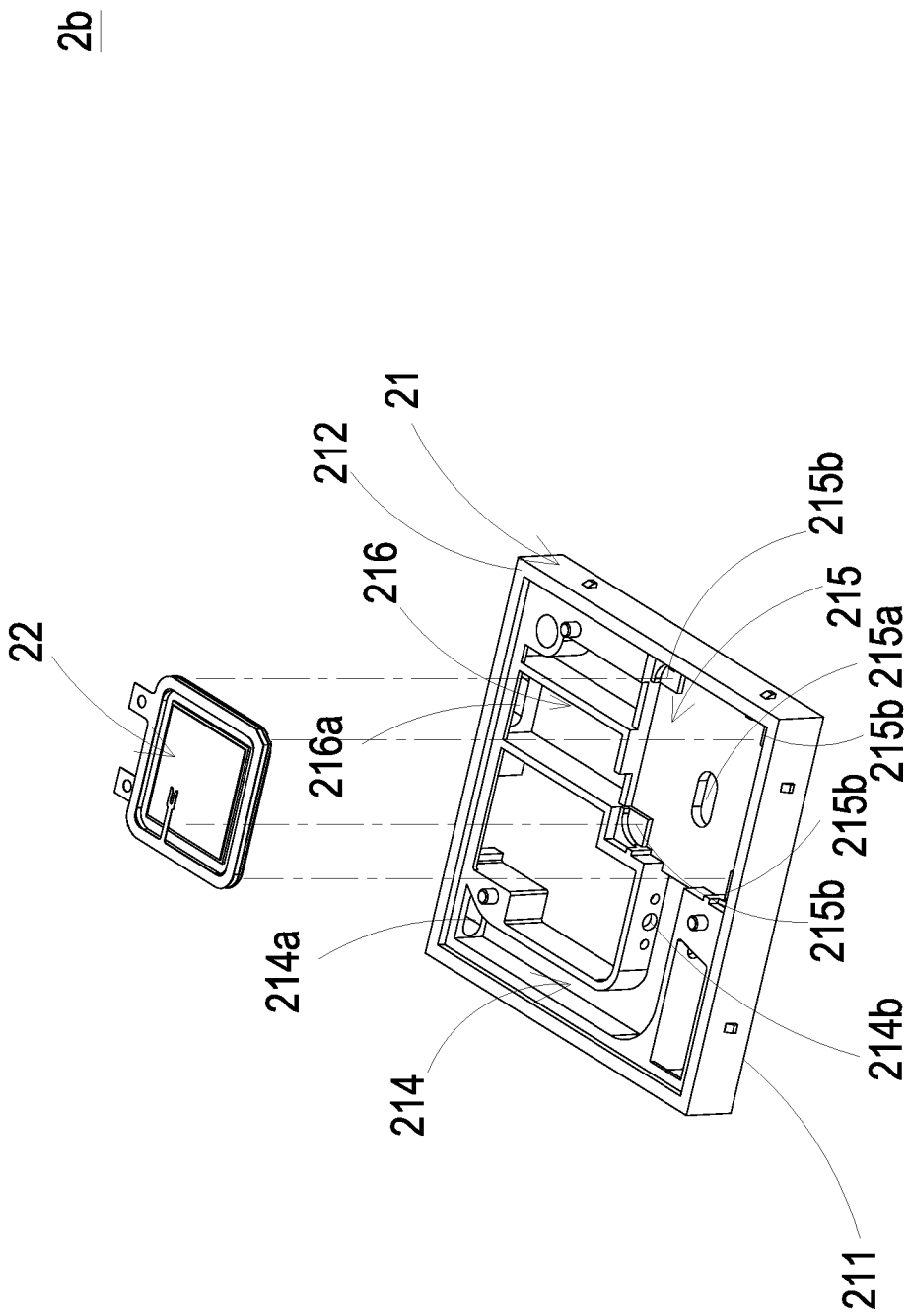

US 11,945,282 B2

GAS DETECTION AND CLEANING SYSTEM FOR VEHICLE

FIELD OF THE INVENTION

The present disclosure relates to a gas detection and cleaning system for a vehicle, and more particularly to a gas detection and cleaning system implemented in an inner space of a vehicle.

BACKGROUND OF THE INVENTION

Recently, people pay more and more attention to the quality of the air around their lives. For example, carbon monoxide, carbon dioxide, volatile organic compounds (VOC), PM2.5, nitric oxide, sulfur monoxide and even the suspended particles contained in the air that expose in the environment would affect the human health, and even harmful for the human's life severely. Therefore, the quality of environmental air has attracted the attention of various countries. Currently, how to detect the air quality and avoid the harm accompany thereby is a problem that urgently needs to be solved.

In order to confirm the quality of the air, it is feasible to use a gas sensor to detect the air surrounding in the environment. If the detection information can be provided in real time to warn the people stay in the environment, it would be helpful for the people to prevent and/or evacuate from hazard environment immediately and avoid from affecting the human health and the harm causing by the hazardous gas exposed in the environment. Therefore, it is a very good application to use a gas sensor to detect the air surrounding in the environment. The air cleaning device is a solution for the air-pollution of modern people to prevent inhalation of the hazardous gas. Therefore, how to combine the air cleaning device with a gas sensor so as to detect the air quality of the inner space of the vehicle in real time whenever and wherever, and provide the benefits of purifying the air is a main developing subject in the present disclosure.

SUMMARY OF THE INVENTION

An object of the present disclosure is to provide a gas detection and cleaning system for a vehicle. With an external modular base externally pluggable to the vehicle power source, a gas detection module and a cleaning device are externally connected and actuated for operations. Thereby, air quality in the inner space of the vehicle can be detected at any time, and an information datum of the air quality in the inner space of the vehicle is transmitted to a first external connection port in real time. The information datum is transmitted through the first external connection port to a driving and controlling module and converted into an actuation information datum, which is externally outputted through a second external connection port. An external port of the cleaning device is connected with the second external connection port for receiving the actuation information datum outputted through the second external connection port. Thereby, the actuation information datum is provided to actuate or close the cleaning device so as to activate the cleaning device to provide the benefits of purifying the air.

In accordance with an aspect of the present disclosure, a gas detection and cleaning system including an external modular base, a gas detection module and a cleaning device is provided for a vehicle. The external modular base includes an external power connector, a power module, at least one first external connection port, at least one second external connection port and a driving and controlling module. The external power connector is adapted to connect with a vehicle power source to provide an operation power to the power module. The at least one first external connection port and the at least one second external connection port are electrically connected to the power module respectively, so as to allow the at least one first external connection port and the at least one second external connection port to connect externally to provide a power source and transmit an information datum. The at least one first external connection port and the at least one second external connection port are connected through the driving and controlling module for communication connection, so that the information datum received by the at least one first external connection port is transmitted to the driving and controlling module, processed and converted into an actuation information datum, and the actuation information datum is externally outputted through the at least one second external connection port. The gas detection module is connected to the at least one first external connection port to provide the power for operations, so as to detect a gas in an inner space of the vehicle and output the information datum in regard to the gas detection to the at least one first external connection port, wherein the information datum is transmitted through the at least one first external connection port to the driving and controlling module, processed and converted into the actuation information datum for being externally outputted through the at least one second external connection port. The cleaning device is connected with the at least one second external connection port through an external port to receive the actuation information datum outputted from the at least one second external connection port to actuate or close the cleaning device.

The above contents of the present disclosure will become more readily apparent to those ordinarily skilled in the art after reviewing the following detailed description and accompanying drawings, in which:

BRIEF DESCRIPTION OF THE DRAWINGS

FIG. 8A is a schematic exploded view illustrating the combination of the piezoelectric actuator and the base according to the present disclosure;

DETAILED DESCRIPTION OF THE PREFERRED EMBODIMENT

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
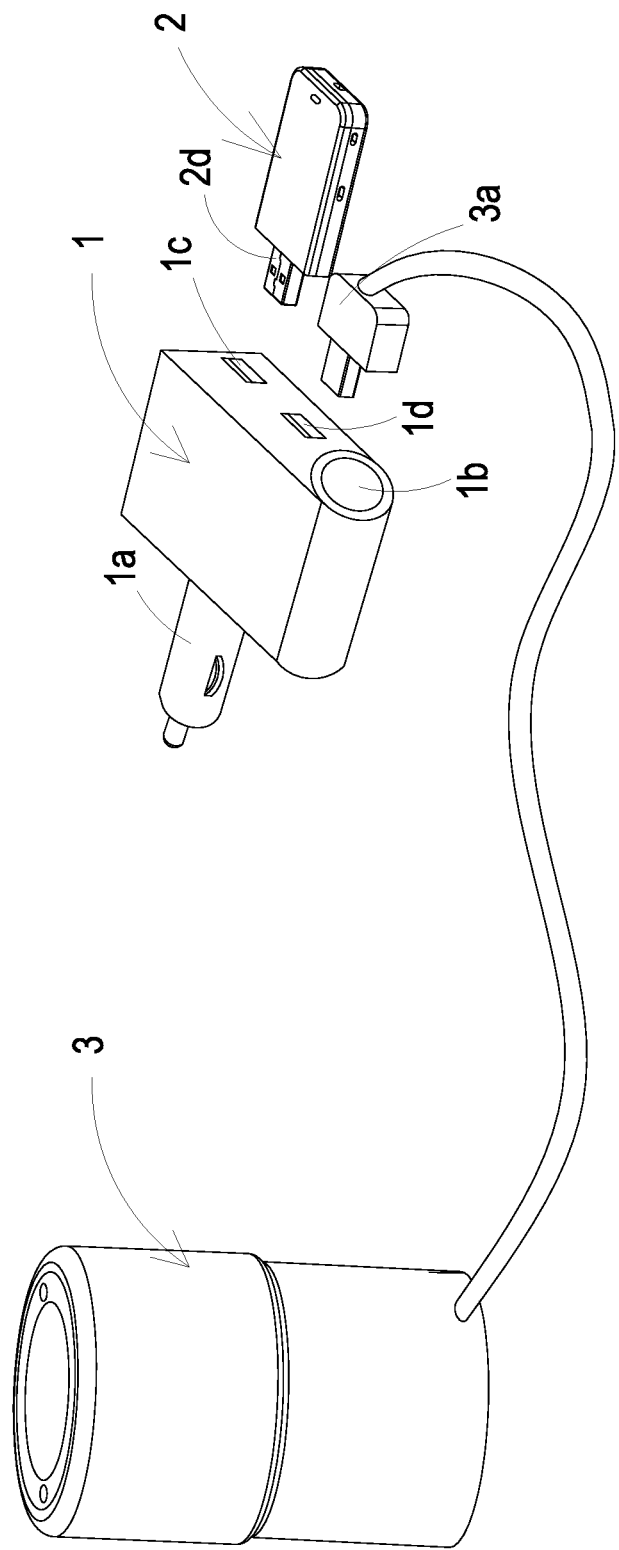
FIG. 1A is a schematic view illustrating a gas detection and cleaning system for a vehicle according to an embodiment of the present disclosure.
Figure 1B:
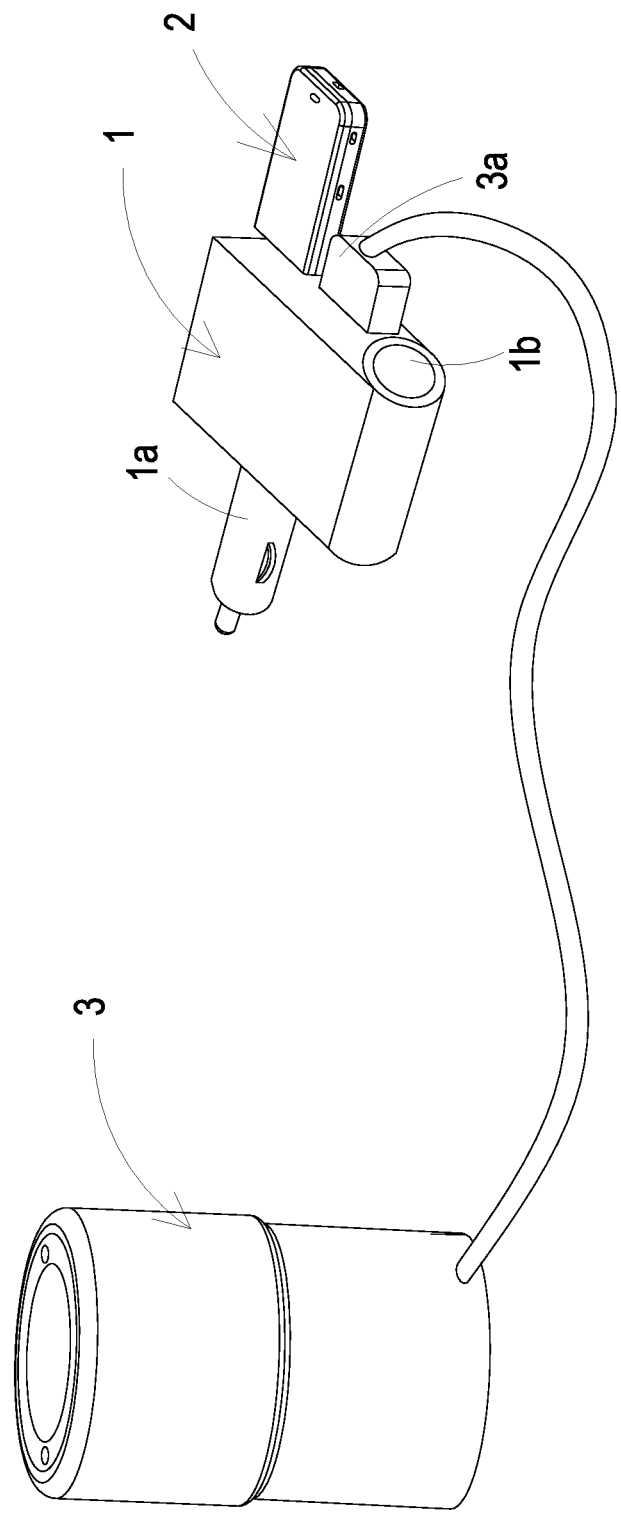
FIG. 1B is a schematic view illustrating the gas detection and cleaning system having the gas detection module and the cleaning device connected to the external modular base according to the embodiment of the present disclosure.
Figure 2:
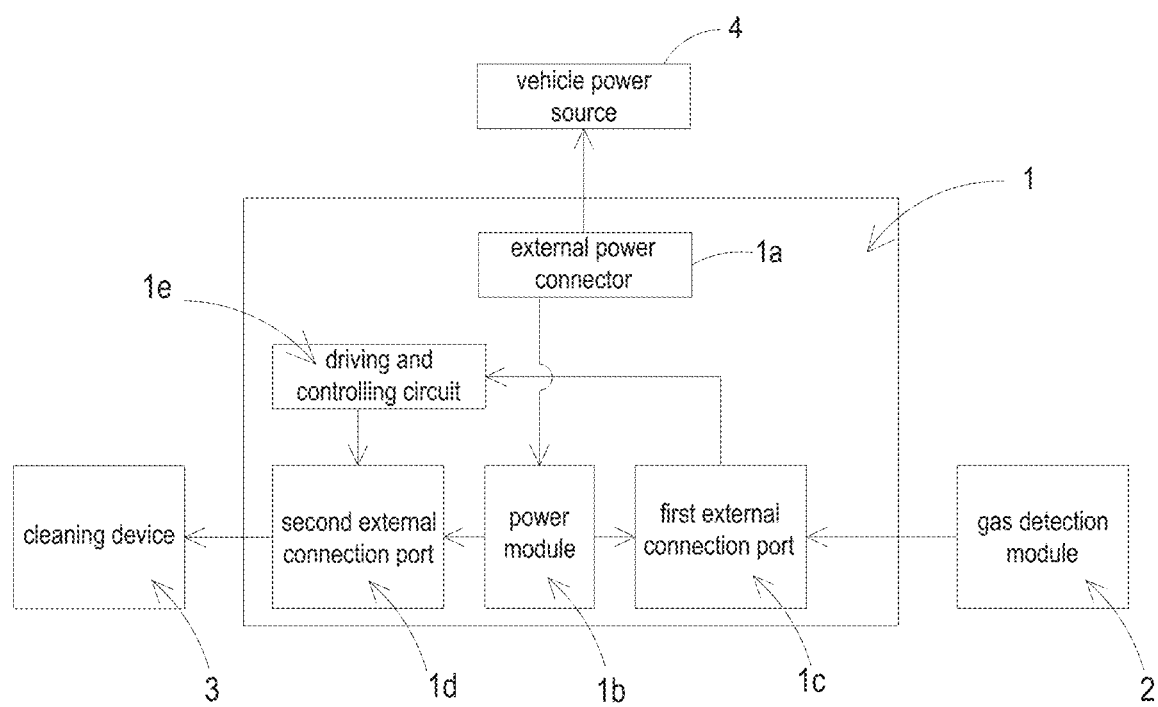
FIG. 2 is a block diagram illustrating a configuration of a control circuit unit and the related components of the gas detection and cleaning system for the vehicle according to an embodiment of the present disclosure.
Figure 3:
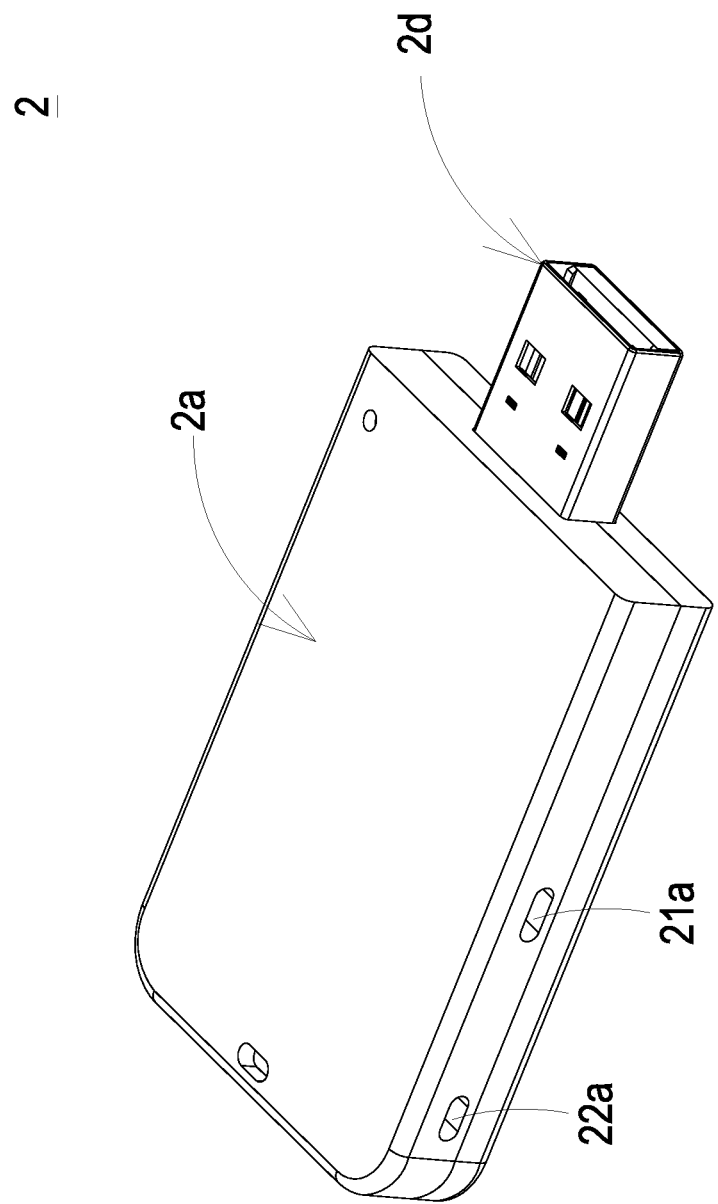
FIG. 3 is a schematic exterior view illustrating the gas detection module of the gas detection and cleaning system for the vehicle according to the embodiment of the present disclosure.
Figure 4:
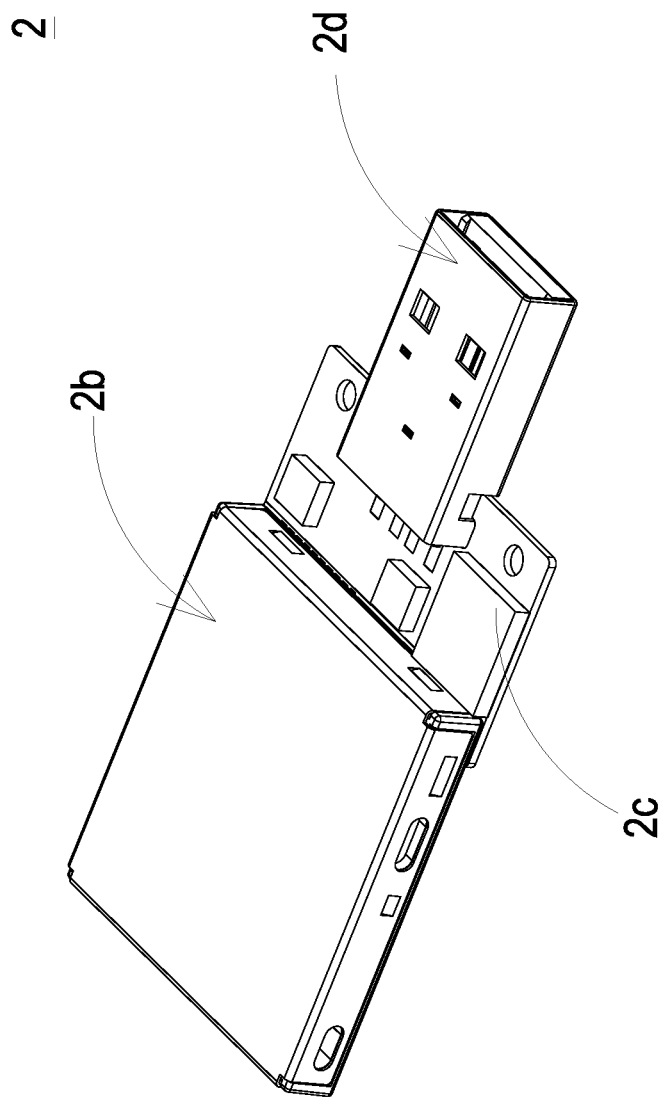
FIG. 4 is a schematic interior view illustrating the related components of the gas detection module of the gas detection and cleaning system for the vehicle according to the embodiment of the present disclosure.

Please refer to FIGS. 1A to 1B and FIG. 2. The present disclosure provides a gas detection and cleaning system for a vehicle. The gas detection and cleaning system includes an external modular base 1, a gas detection module 2 and a cleaning device 3. The external modular base 1 includes an external power connector 1a, a power module 1b, at least one first external connection port 1c, at least one second external connection port 1d and a driving and controlling module 1e. In the embodiment, the numbers of the first external connection port 1c and the second external connection port 1d are one, respectively, but the present disclosure is not limited thereto. Furthermore, the external power connector 1a is adapted to connect with vehicle power source 4 to provide an operation power to the power module 1b. The first external connection port 1c and the second external connection port 1d are electrically connected to the power module 1b respectively, so that external connections of the first external connection port 1c and the second external connection port 1d are allowed to provide a power source and transmit an information datum. The first external connection port 1c and the second external connection port 1d are connected through the driving and controlling module 1e for communication connection, so that the information datum received by the first external connection port 1c is transmitted to the driving and controlling module 1e, processed and converted into an actuation information datum, and the actuation information datum is externally outputted through the second external connection port 1d. The gas detection module 2 is connected to the first external connection port 1c to provide the power for operations, so as to detect a gas in an inner space of the vehicle and output the information datum in regard to the gas detection to the first external connection port 1c. Thereby, the information datum is transmitted through the first external connection port 1c to the driving and controlling module 1e, processed and converted into the actuation information datum for being externally outputted through the second external connection port 1d. The cleaning device 3 is connected with the second external connection port 1d through an external port 3a to receive the actuation information datum outputted from the second external connection port 1d to actuate or close the cleaning device 3.

Please refer to FIG. 1A, FIG. 1B, FIG. 2, FIG. 3 and FIG. 4. In the embodiment, the gas detection module 2 includes a housing 2a, a gas detection main body 2b, a processor control circuit unit 2c and an external connection device 2d. In the embodiment, the gas detection main body 2b, the processor control circuit unit 2c and the external connection device 2d are covered and protected by the housing 2a. The external connection device 2d is exposed out of the housing 2a for correspondingly plugging in and connecting to the first external connection port 1c, thereby the gas detection module 2 is electrically connected and capable of transmitting data. In the embodiment, the housing 2a includes at least one gas inlet 21a and at least one gas outlet 22a. The gas detection main body 2b is disposed within the housing 2a and in fluid communication with the at least one gas inlet 21a and the at least one gas outlet 22a of the housing 2a for detecting the gas introduced from an outside of the housing 2a to obtain the information datum in regard to the gas detection. In the embodiment, the processor control circuit unit 2c is integrally packaged with the gas detection main body 2b in electrical connection, and the external connection device 2d is disposed on the processor control circuit unit 2c and integrally packaged in electrical connection. Therefore, the gas detection module 2 is plugged into the first external connection port 1c through the external connection device 2d. Thus, the gas detection main body 2b detects the gas outside the housing 2a to generate a gas detection signal, which is then received, calculated, processed and converted into the information datum in regard to the gas detection by the processor control circuit unit 2c, and the gas detection datum is outputted to the first external connection port 1c. In that, the gas detection and cleaning system for the vehicle is provided with the pluggable external modular base 1 for externally connecting with the vehicle power source, so as to actuate the gas detection module 2 and the cleaning device 3. Thereby, the air quality in the inner space of the vehicle is detected at any time, and an information datum of the air quality in the inner space of the vehicle is transmitted to the first external connection port 1c in real time, then transmitted to the driving and controlling module 1e through the first external connection port 1c and converted into an actuation information datum, which is externally outputted through the second connection port 1d. Moreover, the eternal port 3a of the cleaning device 3 is integrally connected with the second external connection port 1d for receiving the actuation information datum externally outputted through the second external connection port 1d. Thereby, the actuation information datum is provided to actuate or close the cleaning device 3, so as to provide the benefits of purifying the air. In the embodiment, the external modular base 1 of the gas detection and cleaning system of the present disclosure includes a plurality of second external connection ports 1d. Preferably but not exclusively, the second external connection port 1d is a USB type communication port. Preferably but not exclusively, the second external connection port 1d is a communication port constructed into a car cigarette lighter socket. Preferably but not exclusively, the external port 3a of the cleaning device 3 is a communication port in a constructed into a car cigarette lighter plug for mutually connecting with the at least one second external connection port 1d.

Figure 5A:
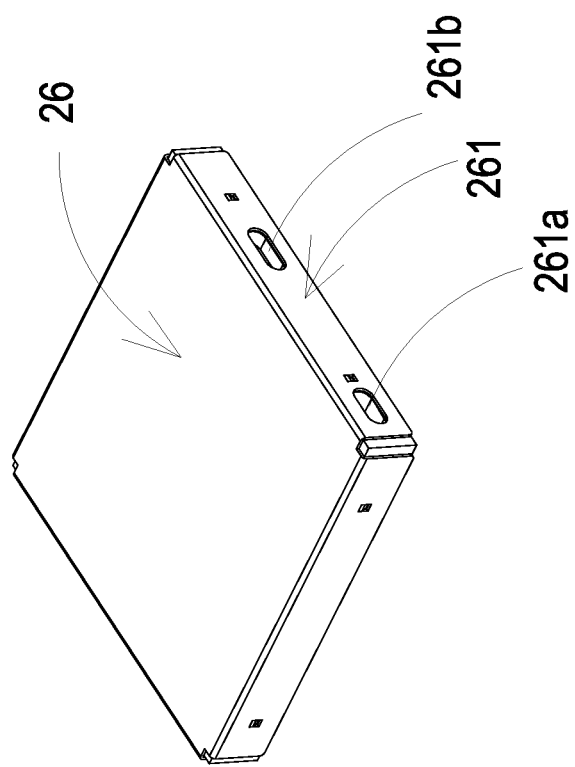
FIG. 5A is schematic exterior view illustrating a gas detection main body according to an embodiment of the present disclosure.
Figure 5B:
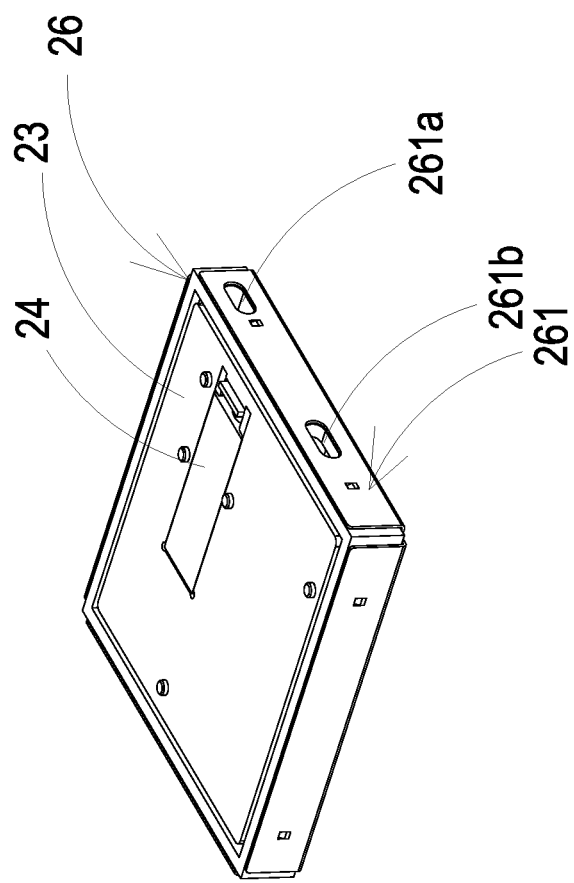
FIG. 5B is a schematic exterior view illustrating the gas detection main body according to the embodiment of the present disclosure from another perspective angle.
Figure 5C:
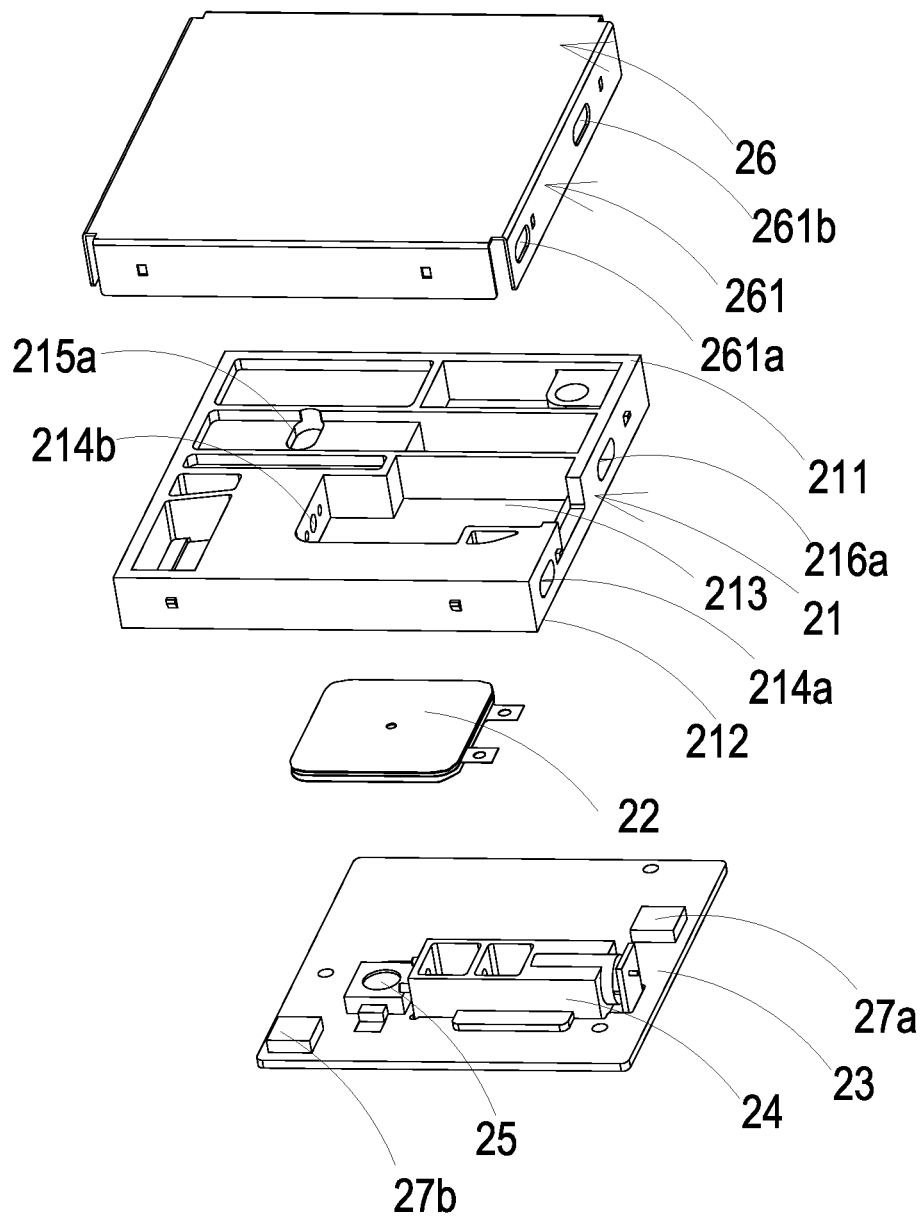
FIG. 5C is a schematic exploded view illustrating the gas detection main body of the present disclosure.
Figure 6A:
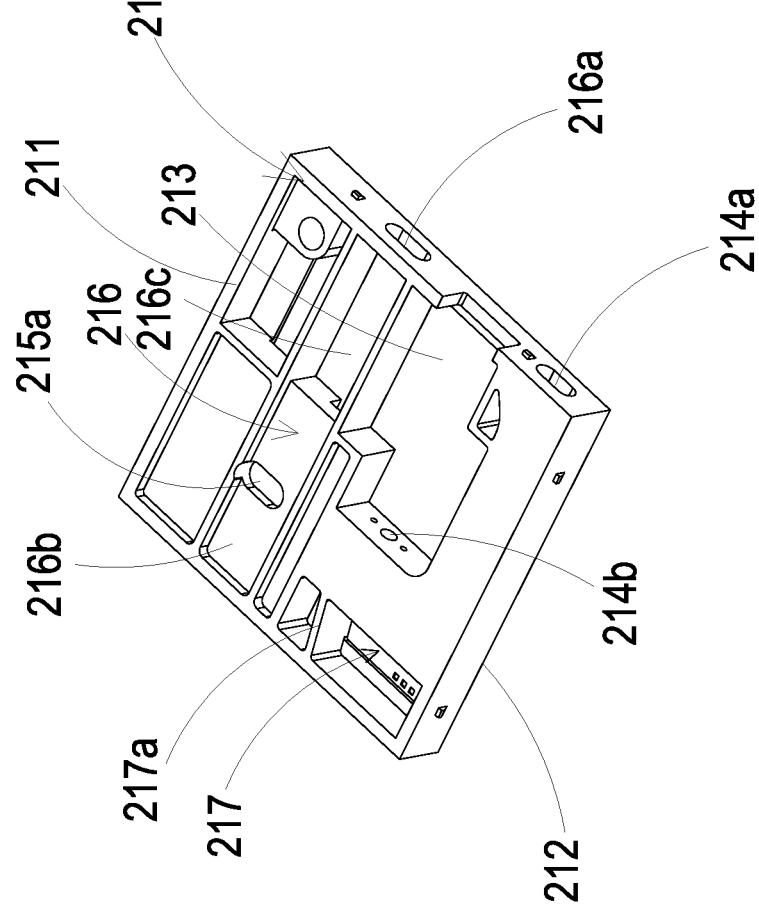
FIG. 6A is a schematic perspective view illustrating a base of the gas detection main body of the present disclosure.
Figure 6B:
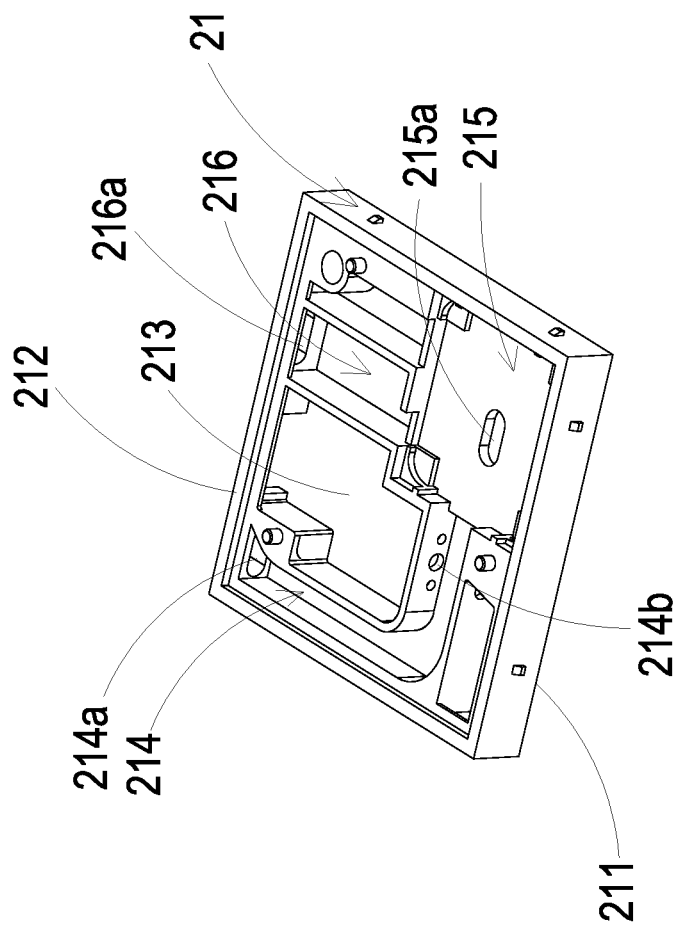
FIG. 6B is a schematic perspective view illustrating the base of the gas detection main body of the present disclosure from another perspective angle.
Figure 7:
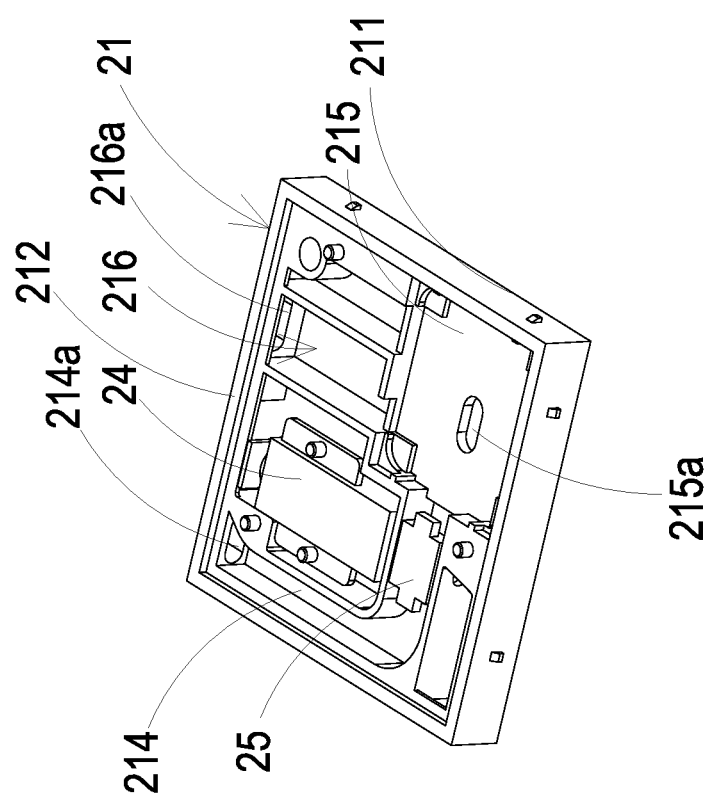
FIG. 7 is a schematic perspective view illustrating a laser component and a particulate sensor accommodated in the base of the present disclosure.
Figure 11A:
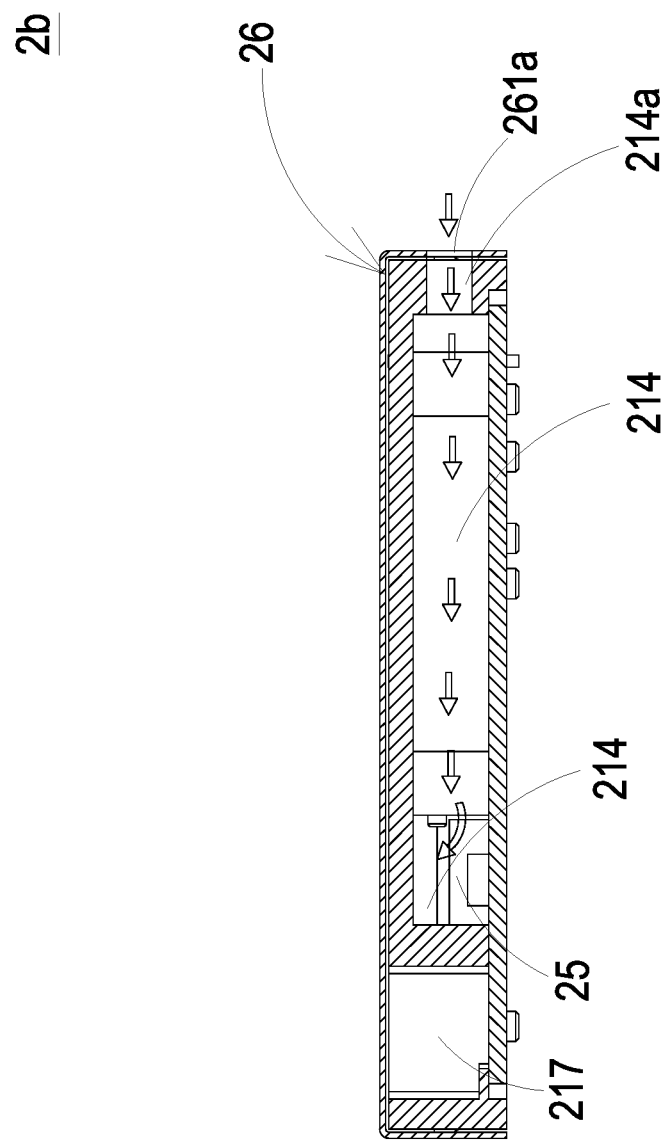
FIGS. 11A to 11C schematically illustrate gas flowing paths of the gas detection main body of the present disclosure.

Please refer to FIGS. 5A to 5C, FIGS. 6A to 6B, FIG. 7 and FIGS. 8A to 8B. In the embodiment, the gas detection main body 2b includes a base 21, a piezoelectric actuator 22, a driving circuit board 23, a laser component 24, a particulate sensor 25 and an outer cover 26. The base 21 includes a first surface 211, a second surface 212, a laser loading region 213, a gas-inlet groove 214, a gas-guiding-component loading region 215 and a gas-outlet groove 216. In the embodiment, the first surface 211 and the second surface 212 are two surfaces opposite to each other. In the embodiment, the laser loading region 213 is hollowed out from the first surface 211 to the second surface 212. The gas-inlet groove 214 is recessed from the second surface 212 and disposed adjacent to the laser loading region 213. The gas-inlet groove 214 includes a gas-inlet 214a and two lateral walls. The gas-inlet 214a is in fluid communication with an environment outside the base 21, and is spatially corresponding to an inlet opening 261a of the outer cover 26. A transparent window 214b is opened on the two lateral walls and is in fluid communication with the laser loading region 213. Therefore, the first surface 211 of the base 21 is covered and attached by the outer cover 26, and the second surface 212 is covered and attached by the driving circuit board 23. Thus, the gas-inlet groove 214 defines a gas-inlet path, as shown in FIG. 7 and FIG. 11A.

Figure 11B:
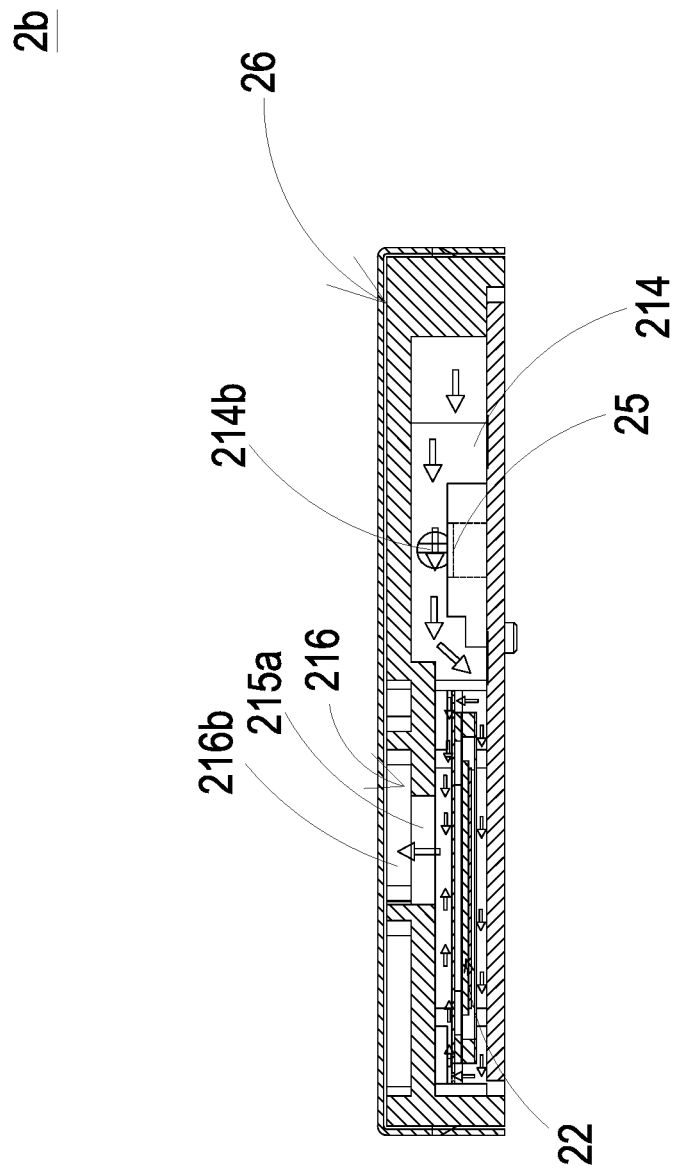
Figure 11C:
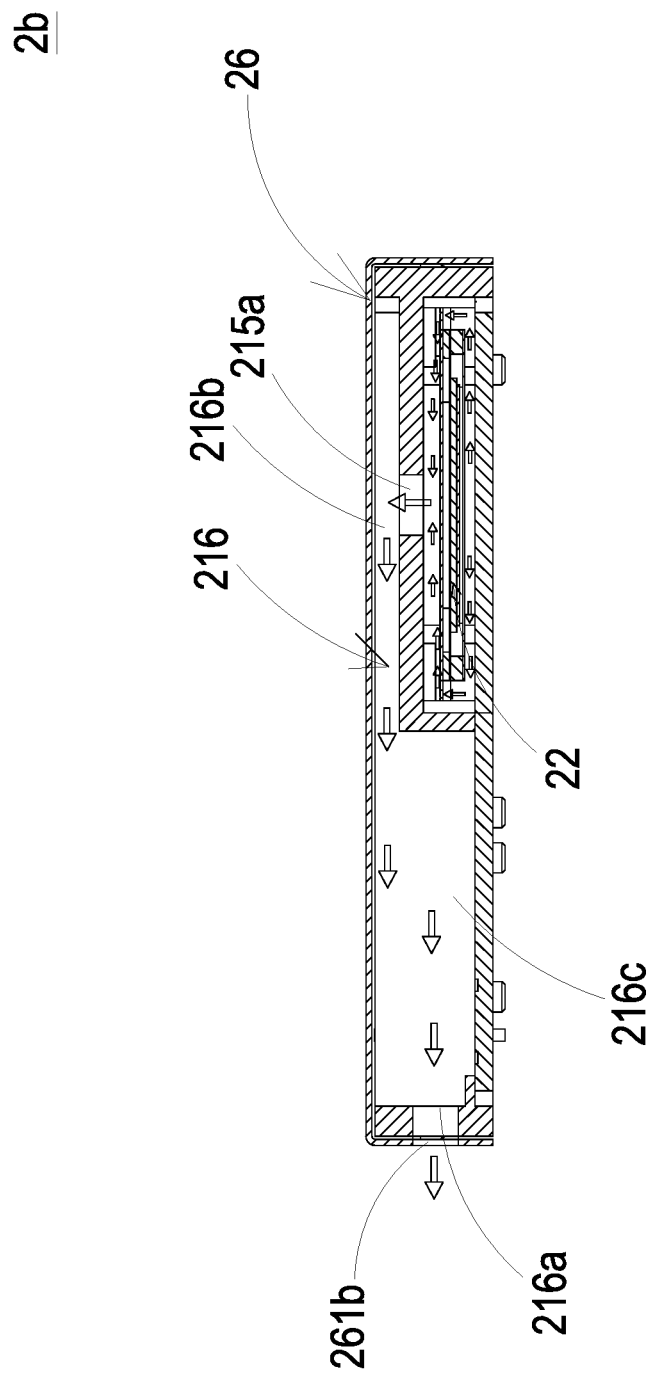

Please refer to FIGS. 6A and 6B. In the embodiment, the gas-guiding-component loading region 215 is recessed from the second surface 212 and in fluid communication with the gas-inlet groove 214. A ventilation hole 215a penetrates a bottom surface of the gas-guiding-component loading region 215. In the embodiment, the gas-outlet groove 216 includes a gas-outlet 216a, and the gas-outlet 216a is spatially corresponding to the outlet opening 261b of the outer cover 26. The gas-outlet groove 216 includes a first section 216b and a second section 216c. The first section 216b hollowed out from the first surface 211 is spatially corresponding to a vertical projection area of the gas-guiding-component loading region 215. The second section 216c is hollowed out from the first surface 211 to the second surface 212 in a region where the first surface 211 is not aligned with the vertical projection area of the gas-guiding-component loading region 215. The first section 216b and the second section 216c are connected to form a stepped structure. Moreover, the first section 216b of the gas-outlet groove 216 is in fluid communication with the ventilation hole 215a of the gas-guiding-component loading region 215, and the second section 216c of the gas-outlet groove 216 is in fluid communication with the gas-outlet 216a. In that, when the first surface 211 of the base 21 is attached and covered by the outer cover 26, and the second surface 212 of the base 21 is attached and covered by the driving circuit board 23, the gas-outlet groove 216 defines a gas-outlet path, as shown in FIGS. 11B and 11C.

Please refer to FIG. 5C and FIG. 7. In the embodiment, the laser component 24 and the particulate sensor 25 are disposed on the driving circuit board 23 and accommodated in the base 21. In order to describe the positions of the laser component 24 and the particulate sensor 25 in the base 21, the driving circuit board 23 is omitted in FIG. 7 for clarity. Please refer to FIG. 5C, FIG. 6B, FIG. 7 and FIG. 12. In the embodiment, the laser component 24 is accommodated in the laser loading region 213 of the base 21, and the particulate sensor 25 is accommodated in the gas-inlet groove 214 of the base 21 and aligned to the laser component 24. In addition, the laser component 24 is spatially corresponding to the transparent window 214b, a light beam emitted by the laser component 24 passes through the transparent window 214b and is irradiated into the gas-inlet groove 214. A light beam path emitted from the laser component 24 passes through the transparent window 214b and extends in a direction perpendicular to the gas-inlet groove 214. In the embodiment, a projecting light beam emitted from the laser component 24 passes through the transparent window 214b and enters the gas-inlet groove 214, and suspended particles contained in the gas passing through the gas-inlet groove 214 is irradiated by the projecting light beam. When the suspended particles contained in the gas are irradiated to generate scattered light spots, the scattered light spots are detected and calculated by the particulate sensor 25 for obtaining related information in regard to the sizes and the concentration of the suspended particles contained in the gas. In the embodiment, the particulate sensor 25 is a PM2.5 sensor.

Figure 8B:
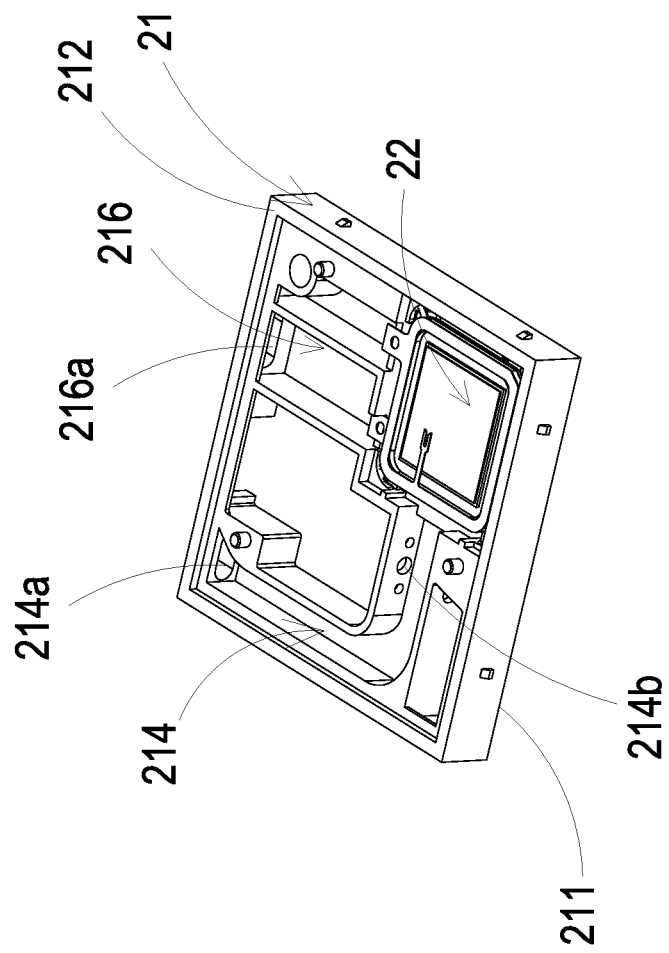
FIG. 8B is a schematic perspective view illustrating the combination of the piezoelectric actuator and the base according to the present disclosure.

Please refer to FIG. 8A and FIG. 8B. The piezoelectric actuator 22 is accommodated in the gas-guiding-component loading region 215 of the base 21. Preferably but not exclusively, the gas-guiding-component loading region 215 is square and includes four positioning protrusions 215b disposed at four corners of the gas-guiding-component loading region 215, respectively. The piezoelectric actuator 22 is disposed in the gas-guiding-component loading region 215 through the four positioning protrusions 215b. In addition, as shown in FIGS. 6A, 6B, 11B and 11C, the gas-guiding-component loading region 215 is in fluid communication with the gas-inlet groove 214. When the piezoelectric actuator 22 is enabled, the gas in the gas-inlet groove 214 is inhaled by the piezoelectric actuator 22, so that the gas flows into the piezoelectric actuator 22. Thereafter, the gas is transported into the gas-outlet groove 216 through the ventilation hole 215a of the gas-guiding-component loading region 215.

Please refer to FIGS. 5A and 5B. In the embodiment, the driving circuit board 23 covers and is attached to the second surface 212 of the base 21, and the laser component 24 is positioned and disposed on the driving circuit board 23, and is electrically connected to the driving circuit board 23. The particulate sensor 25 is positioned and disposed on the driving circuit board 23, and is electrically connected to the driving circuit board 23. Preferably but not exclusively, the particulate sensor 25 is disposed at an orthogonal position where the gas-inlet groove 214 intersects with the light beam path of the laser component 24. The outer cover 26 covers the base 21 and is attached to the first surface 211 of the base 21. Moreover, the outer cover 26 includes a side plate 261. The side plate 261 has an inlet opening 261a and an outlet opening 261b. When the outer cover 26 covers the base 21, the inlet opening 261a is spatially corresponding to the gas-inlet 214a of the base 21 (as shown in FIG. 11A), and the outlet opening 261b is spatially corresponding to the gas-outlet 216a of the base 21 (as shown in FIG. 11C).

Figure 9A:
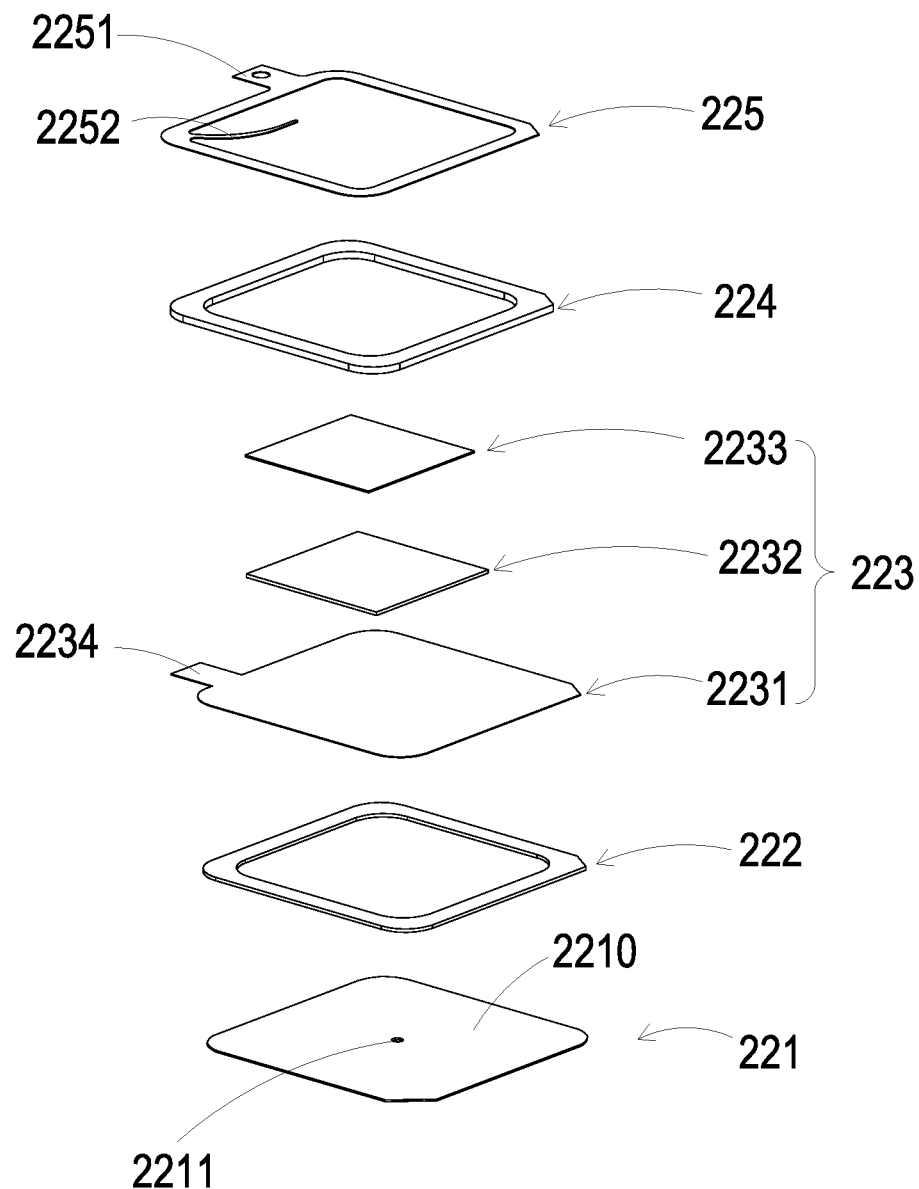
FIG. 9A is a schematic exploded view illustrating the piezoelectric actuator of the present disclosure.
Figure 9B:
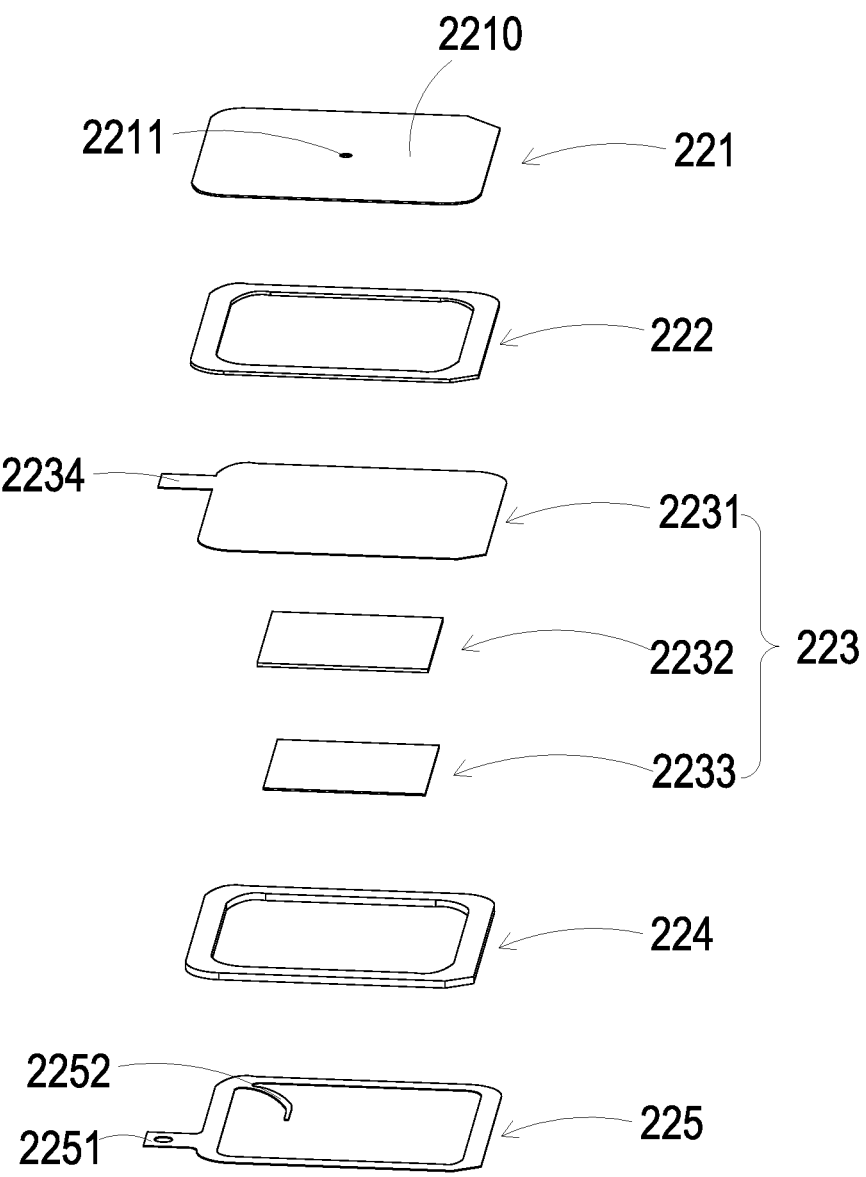
FIG. 9B is a schematic exploded view illustrating the piezoelectric actuator of the present disclosure from another perspective angle.

Please refer to FIGS. 9A and 9B. In the embodiment, the piezoelectric actuator 22 includes a gas-injection plate 221, a chamber frame 222, an actuator element 223, an insulation frame 224 and a conductive frame 225. In the embodiment, the gas-injection plate 221 is made by a flexible material and includes a suspension plate 2210 and a hollow aperture 2211. The suspension plate 2210 is a sheet structure and permitted to undergo a bending deformation. Preferably but not exclusively, the shape and the size of the suspension plate 2210 are corresponding to an inner edge of the gas-guiding-component loading region 215. The shape of the suspension plate 2210 is one selected from the group consisting of a square, a circle, an ellipse, a triangle and a polygon. The hollow aperture 2211 passes through a center of the suspension plate 2210, so as to allow the gas to flow therethrough.

In the embodiment, the chamber frame 222 is carried and stacked on the gas-injection plate 221. In addition, the shape of the chamber frame 222 is corresponding to the gas-injection plate 221. The actuator element 223 is carried and stacked on the chamber frame 222. A resonance chamber 226 is collaboratively defined by the actuator element 223, the chamber frame 222 and the suspension plate 2210 and formed between the actuator element 223, the chamber frame 222 and the suspension plate 2210. The insulation frame 224 is carried and stacked on the actuator element 223 and the appearance of the insulation frame 224 is similar to that of the chamber frame 222. The conductive frame 225 is carried and stacked on the insulation frame 224, and the appearance of the conductive frame 225 is similar to that of the insulation frame 224. In addition, the conductive frame 225 includes a conducting pin 2251 and a conducting electrode 2252. The conducting pin 2251 is extended outwardly from an outer edge of the conductive frame 225, and the conducting electrode 2252 is extended inwardly from an inner edge of the conductive frame 225. Moreover, the actuator element 223 further includes a piezoelectric carrying plate 2231, an adjusting resonance plate 2232 and a piezoelectric plate 2233. The piezoelectric carrying plate 2231 is carried and stacked on the chamber frame 222. The adjusting resonance plate 2232 is carried and stacked on the piezoelectric carrying plate 2231. The piezoelectric plate 2233 is carried and stacked on the adjusting resonance plate 2232. The adjusting resonance plate 2232 and the piezoelectric plate 2233 are accommodated in the insulation frame 224. The conducting electrode 2252 of the conductive frame 225 is electrically connected to the piezoelectric plate 2233. In the embodiment, the piezoelectric carrying plate 2231 and the adjusting resonance plate 2232 are made by a conductive material. The piezoelectric carrying plate 2231 includes a piezoelectric pin 2234. The piezoelectric pin 2234 and the conducting pin 2251 are electrically connected to a driving circuit (not shown) of the driving circuit board 23, so as to receive a driving signal, such as a driving frequency and a driving voltage. In that, an electric circuit for the driving signal is formed by the piezoelectric pin 2234, the piezoelectric carrying plate 2231, the adjusting resonance plate 2232, the piezoelectric plate 2233, the conducting electrode 2252, the conductive frame 225 and the conducting pin 2251. Moreover, the insulation frame 224 is insulated between the conductive frame 225 and the actuator element 223, so as to avoid the occurrence of a short circuit. Thereby, the driving signal is transmitted to the piezoelectric plate 2233. After receiving the driving signal such as the driving frequency and the driving voltage, the piezoelectric plate 2233 deforms due to the piezoelectric effect, and the piezoelectric carrying plate 2231 and the adjusting resonance plate 2232 are further driven to generate the bending deformation in the reciprocating manner.

As described above, the adjusting resonance plate 2232 is located between the piezoelectric plate 2233 and the piezoelectric carrying plate 2231 and served as a buffer between the piezoelectric plate 2233 and the piezoelectric carrying plate 2231. Thereby, the vibration frequency of the piezoelectric carrying plate 2231 is adjustable. Basically, the thickness of the adjusting resonance plate 2232 is greater than the thickness of the piezoelectric carrying plate 2231, and the thickness of the adjusting resonance plate 2232 is adjustable, thereby adjusting the vibration frequency of the actuator element 223.

Please refer to FIGS. 9A to 9C and FIG. 10A. In the embodiment, the gas-injection plate 221, the chamber frame 222, the actuator element 223, the insulation frame 224 and the conductive frame 225 are stacked and positioned in the gas-guiding-component loading region 215 sequentially, so that the piezoelectric actuator 22 is supported and positioned in the gas-guiding-component loading region 215. The bottom of the gas-injection plate 221 is fixed on the four positioning protrusions 215b of the gas-guiding-component loading region 215 for supporting and positioning, so that the suspension plate 2210 of the gas-injection plate 221 and an inner edge of the gas-guiding-component loading region 215 define a plurality of clearances 2212 in the piezoelectric actuator 22 for gas flowing.

Figure 10A:
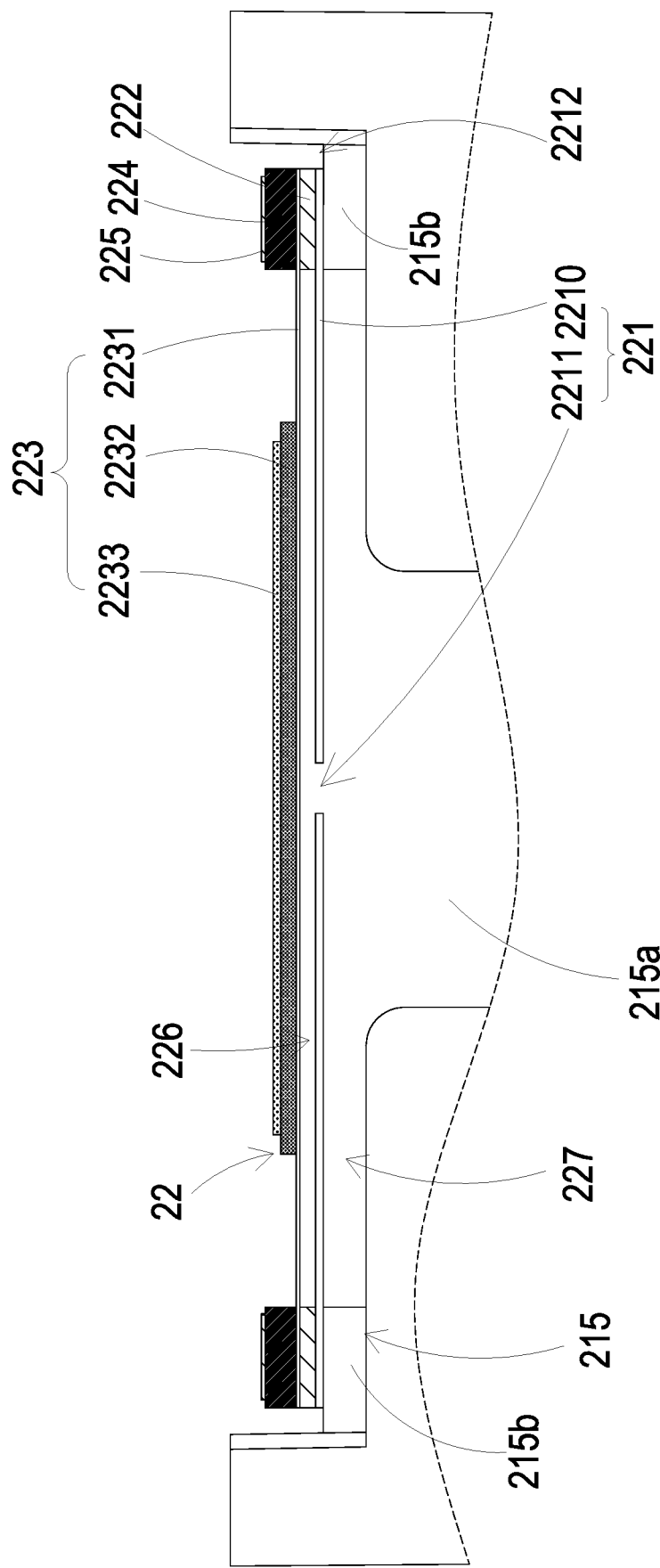
FIG. 10A is a schematic cross-sectional view illustrating the piezoelectric actuator accommodated in the gas-guiding-component loading region according to the present disclosure.

Please refer to FIG. 10A. A flowing chamber 227 is formed between the gas-injection plate 221 and the bottom surface of the gas-guiding-component loading region 215. The flowing chamber 227 is in fluid communication with the resonance chamber 226 between the actuator element 223, the chamber frame 222 and the suspension plate 2210 through the hollow aperture 2211 of the gas-injection plate 221. Through controlling the vibration frequency of the gas in the resonance chamber 226 and making it close to the vibration frequency of the suspension plate 2210, the Helmholtz resonance effect is introduced between the resonance chamber 226 and the suspension plate 2210, and thereby improves the efficiency of gas transportation.

Figure 10B:
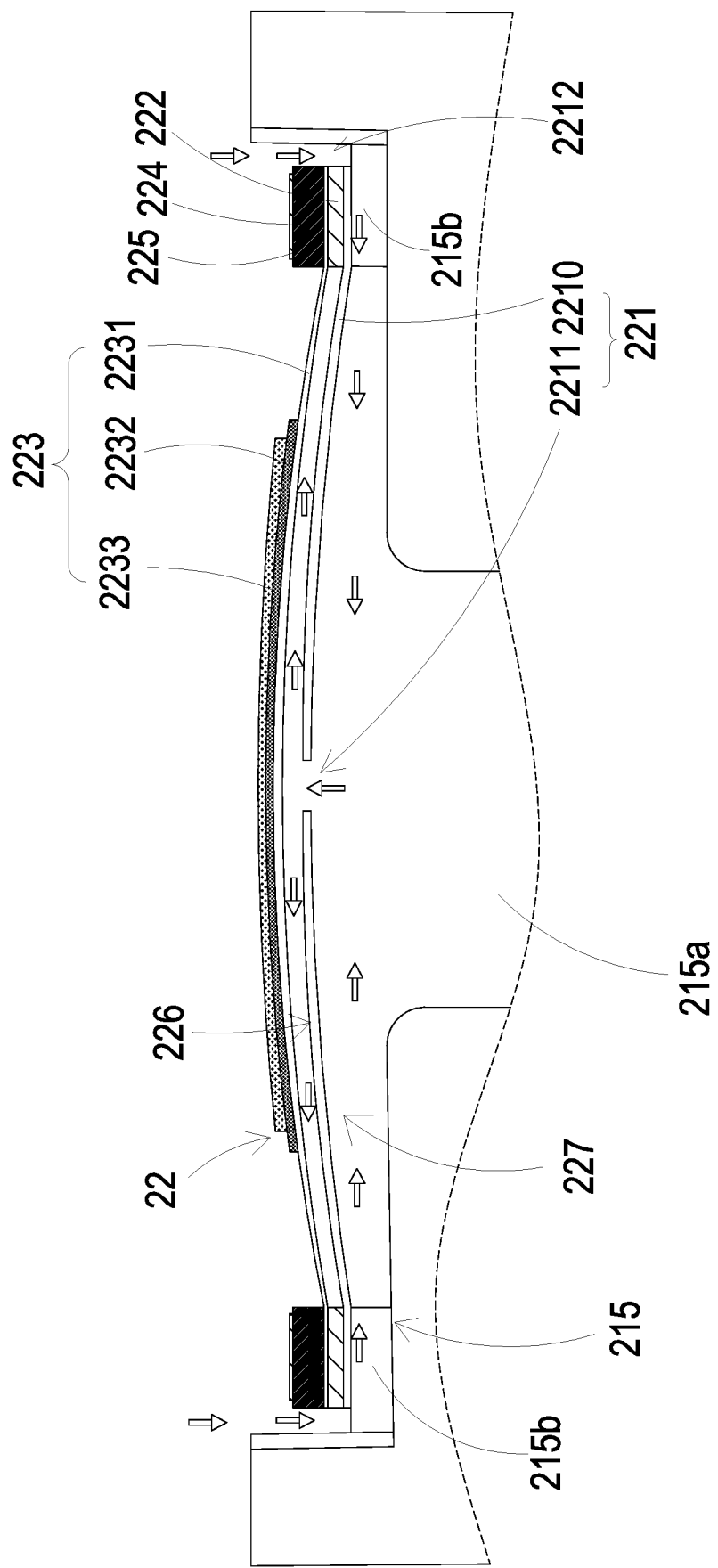
FIGS. 10B and 10C schematically illustrate the actions of the piezoelectric actuator of FIG. 10A.
Figure 10C:
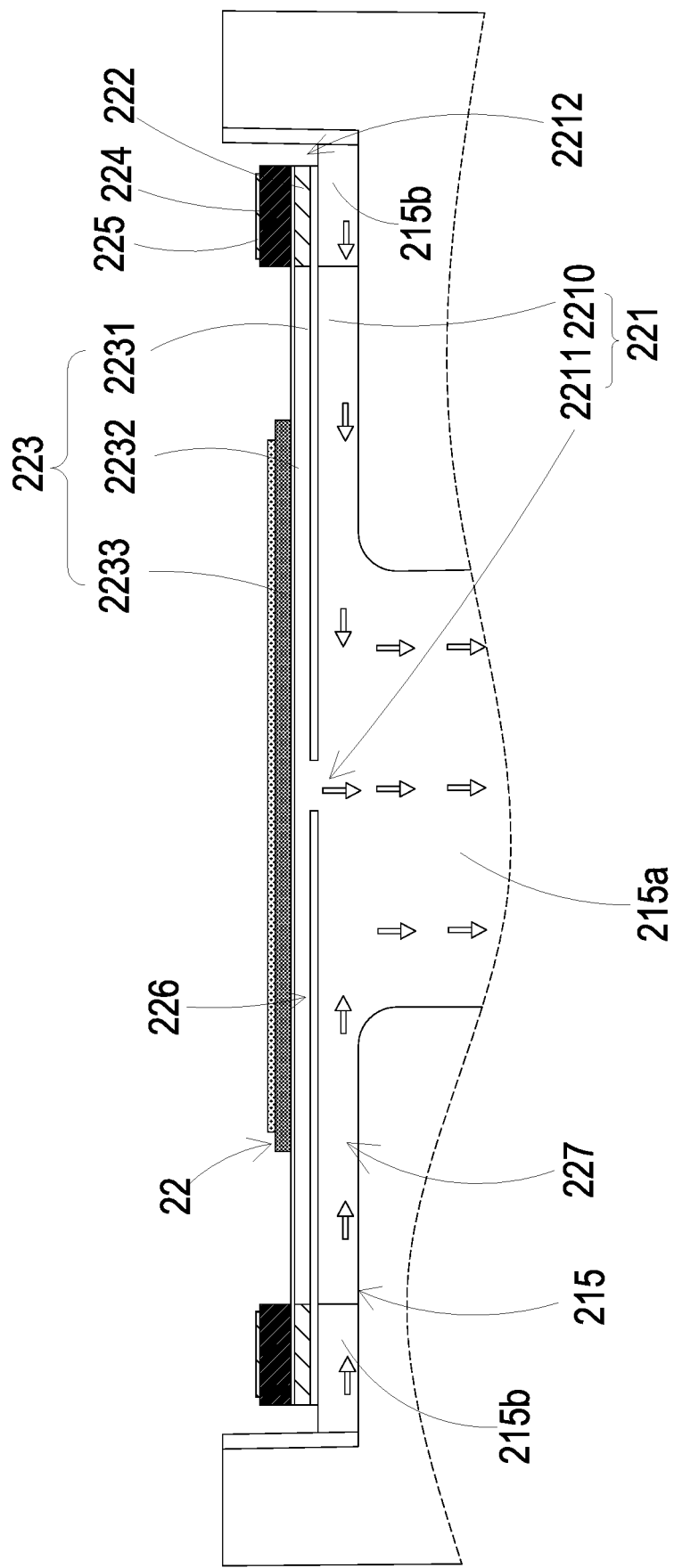

FIGS. 10B and 10C schematically illustrate the actions of the piezoelectric actuator of FIG. 10A. Please refer to FIG. 10B. When the piezoelectric plate 2233 is moved away from the bottom surface of the gas-guiding-component loading region 215, the suspension plate 2210 of the gas-injection plate 221 is driven to move away from the bottom surface of the gas-guiding-component loading region 215 by the piezoelectric plate 2233. In that, the volume of the flowing chamber 227 is expanded rapidly, the internal pressure of the flowing chamber 227 is decreased to form a negative pressure, and the gas outside the piezoelectric actuator 22 is inhaled through the clearance 2212 and enters the resonance chamber 226 through the hollow aperture 2211. Consequently, the pressure in the resonance chamber 226 is increased to generate a pressure gradient. Further as shown in FIG. 10C, when the suspension plate 2210 of the gas-injection plate 221 is driven by the piezoelectric plate 2233 to move towards the bottom surface of the gas-guiding-component loading region 215, the gas in the resonance chamber 226 is discharged out rapidly through the hollow aperture 2211, and the gas in the flowing chamber 227 is compressed. In that, the converged gas is quickly and massively ejected out of the flowing chamber 227 in a gas state close to an ideal gas state of the Benulli's law, and transported to the ventilation hole 215a of the gas-guiding-component loading region 215. By repeating the above actions shown in FIG. 10B and FIG. 10C, the piezoelectric plate 2233 is driven to generate the bending deformation in a reciprocating manner According to the principle of inertia, the gas pressure inside the resonance chamber 226 after exhausting is lower than the equilibrium gas pressure outside, and the gas is introduced into the resonance chamber 226 again. Moreover, the vibration frequency of the gas in the resonance chamber 226 is controlled to be close to the vibration frequency of the piezoelectric plate 2233, so as to generate the Helmholtz resonance effect and to achieve the gas transportation at high speed and in large quantities.

Please refer to FIGS. 11A to 11C. FIGS. 11A to 11C schematically illustrate gas flowing paths of the gas detection main body 2b. Firstly, as shown in FIG. 11A, the gas is inhaled through the inlet opening 261a of the outer cover 26, flows into the gas-inlet groove 214 of the base 21 through the gas-inlet 214a, and is transported to the position of the particulate sensor 25. Further as shown in FIG. 11B, the piezoelectric actuator 22 is enabled continuously to inhale the gas in the gas-inlet path, so as to facilitate the gas to be introduced and transported above the particulate sensor 25 rapidly and stably. At this time, a projecting light beam emitted from the laser component 24 passes through the transparent window 214b to irritate the suspended particles contained in the gas flowing above the particulate sensor 25 in the gas-inlet groove 214. When the suspended particles contained in the gas are irradiated to generate scattered light spots, the scattered light spots are detected and calculated by the particulate sensor 25 for obtaining related information in regard to the sizes and the concentration of the suspended particles contained in the gas. Furthermore, the gas above the particle sensor 25 is continuously driven and transported by the piezoelectric actuator 22, flowing into the ventilation hole 215a of the gas-guiding-component loading region 215, and transported to the first section 216b of the gas-outlet groove 216. As shown in FIG. 11C, after the gas flows into the first section 216b of the gas-outlet groove 216, the gas is continuously transported into the first section 216b by the piezoelectric actuator 22, and the gas in the first section 216b is pushed to the second section 216c. Finally, the gas is discharged out through the gas-outlet 216a and the outlet opening 261b.

Figure 12:
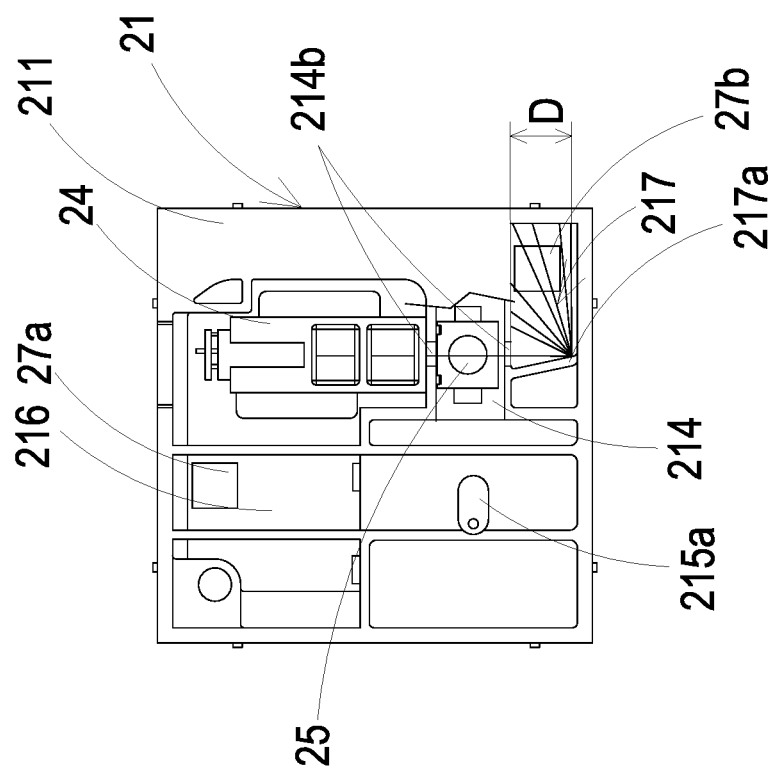
FIG. 12 schematically illustrates a light beam path emitted from the laser component of the gas detection main body of the present disclosure.

As shown in FIG. 12, the base 21 further includes a light trapping region 217. The light trapping region 217 is hollowed out from the first surface 211 to the second surface 212 and is spatially corresponding to the laser loading region 213. In the embodiment, the light trapping region 217 is corresponding to the transparent window 214b so that the light beam emitted by the laser component 24 is projected into the light trapping region 217. The light trapping region 217 includes a light trapping structure 217a having an oblique cone surface. The light trapping structure 217a is spatially corresponding to the light beam path emitted from the laser component 24. In addition, the projecting light beam emitted from the laser component 24 is reflected into the light trapping region 217 through the oblique cone surface of the light trapping structure 217a. It prevents the projecting light beam from being reflected to the position of the particulate sensor 25. In the embodiment, a light trapping distance D is maintained between the transparent window 214b and a position where the light trapping structure 217a receives the projecting light beam. Preferably but not exclusively, the light trapping distance D is greater than 3 mm. When the light trapping distance D is less than 3 mm, the projecting light beam projected on the light trapping structure 217a could be easily reflected back to the position of the particulate sensor 25 directly due to excessive stray light generated after reflection, and resulted in distortion of detection accuracy.

Please refer to FIG. 5C and FIG. 12. The gas detection main body 2b of the present disclosure can not only detect the suspended particles in the gas, but also detect the characteristics of the introduced gas. Preferably but not exclusively, the gas can be detected is at least one selected from the group consisting of formaldehyde, ammonia, carbon monoxide, carbon dioxide, oxygen, ozone and a combination thereof. In the embodiment, the gas detection main body 2b further includes a first volatile-organic-compound sensor 27a. The first volatile-organic-compound sensor 27a is positioned and disposed on the driving circuit board 23, electrically connected to the driving circuit board 23, and accommodated in the gas-outlet groove 216, so as to detect the gas flowing through the gas-outlet path of the gas-outlet groove 216. Thus, the concentration or the characteristics of volatile organic compounds contained in the gas in the gas-outlet path is detected. Alternatively, in an embodiment, the gas detection main body 2b further includes a second volatile-organic-compound sensor 27b. The second volatile-organic-compound sensor 27b is positioned and disposed on the driving circuit board 23, and electrically connected to the driving circuit board 23. In the embodiment, the second volatile-organic-compound sensor 27b is accommodated in the light trapping region 217. Thus, the concentration or the characteristics of volatile organic compounds contained in the gas flowing through the gas-inlet path of the gas-inlet groove 214 and transported into the light trapping region 217 through the transparent window 214b is detected.

In summary, the present disclosure provides a gas detection and cleaning system for a vehicle. With an external modular base externally pluggable to the vehicle power source, a gas detection module and a cleaning device are externally connected and actuated for operations. Thereby, air quality in the inner space of the vehicle could be detected at any time, and an information datum of the air quality in the inner space of the vehicle is transmitted to a first external connection port in real time. The information datum is transmitted through the first external connection port to a driving and controlling module and converted into an actuation information datum, which is externally outputted through a second external connection port. An external port of the cleaning device is connected with the second external connection port for receiving the actuation information datum externally outputted through the second external connection port. Thereby, the actuation information datum is provided to actuate or close the cleaning device. Furthermore, the cleaning device is utilized to provide the benefits of purifying the air. The present disclosure fulfills the requirements of industrial applicability and inventive steps.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A gas detection and cleaning system for a vehicle, comprising:
   an external modular base comprising an external power connector, a power module, at least one first external connection port, at least one second external connection port and a driving and controlling circuit, wherein the external power connector is adapted to connect with vehicle power source to provide an operation power to the power module, wherein the at least one first external connection port and the at least one second external connection port are electrically connected to the power module respectively, so as to allow the at least one first external connection port and the at least one second external connection port to connect externally and provide a power source and transmit an information datum, wherein the at least one first external connection port and the at least one second external connection port are connected through the driving and controlling circuit for communication connection, so that the information datum received by the at least one first external connection port is transmitted to the driving and controlling circuit, processed and converted into an actuation information datum, and the actuation information datum is externally outputted through the at least one second external connection port;

a gas detection module connected to the at least one first external connection port to provide the power for operations, so as to detect a gas in an inner space of the vehicle and output the information datum in regard to the gas detection to the at least one first external connection port, wherein the information datum is transmitted through the at least one first external connection port to the driving and controlling circuit, processed and converted into the actuation information datum for externally outputting through the at least one second external connection port, wherein the gas detection module comprises:

a housing;

a gas detection main body disposed within the housing for detecting gas introduced from an outside of the housing to obtain the information datum in regard to the gas detection and comprising:

a first surface;

a second surface opposite to the first surface;

a laser loading region hollowed out from the first surface to the second surface;

a gas-inlet groove recessed from the second surface and disposed adjacent to the laser loading region, wherein the gas-inlet groove comprises a gas-inlet, in fluid communication with an environment outside the base, and two lateral walls, and a transparent window is opened on the two lateral walls and is in fluid communication with the laser loading region;

a gas-guiding-component loading region recessed from the second surface and in fluid communication with the gas-inlet groove, wherein a ventilation hole penetrates a bottom surface of the gas-guiding-component loading region; and a gas-outlet groove recessed from the first surface corresponding to the bottom surface of the gas-guiding-component loading region, and hollowed out from the first surface to the second surface in a region where the first surface is not aligned with the gas-guiding-component loading region, wherein the gas-outlet groove is in fluid communication with the ventilation hole, and a gas-outlet is disposed in the gas-outlet groove and in fluid communication with the environment outside the base;

a piezoelectric actuator accommodated in the gas-guiding-component loading region;

a driving circuit board covered and attached to the second surface of the base;

a laser component positioned and disposed on and electrically connected to the driving circuit board, and accommodated in the laser loading region, wherein a light beam path emitted from the laser component passes through the transparent window and extends in a direction perpendicular to the gas-inlet groove; and a particulate sensor positioned and disposed on and electrically connected to the driving circuit board, and disposed at an orthogonal position where the gas-inlet groove intersects with the light beam path of the laser component, so that suspended particles passing through the gas-inlet groove and irradiated by a projecting light beam emitted from the laser component are detected;

a processor control circuit unit integrally packaged with the gas detection main body in electrical connection; and an external connector disposed on the processor control circuit unit and integrally packaged in electrical connection; and a cleaning device comprising an external port connected with the at least one second external connection port to receive the actuation information datum outputted from the at least one second external connection port, wherein the cleaning device is controlled to be actuated or turned off according to the actuation information datum.

2. The gas detection and cleaning system for the vehicle according to claim 1, wherein the gas detection module comprises:

the housing comprising at least one gas inlet and at least one gas outlet;

the gas detection main body in fluid communication with the at least one gas inlet and the at least one gas outlet of the housing;

wherein the gas detection main body, the processor control circuit unit and the external connector are covered and protected by the housing, wherein the external connector is exposed out of the housing for connecting to the at least one first external connection port to provide the power and transmit the information datum, such that the gas detection module is in electrical connection with the external modular base, the gas detection main body is actuated to detect the gas outside the housing and generate a gas detection signal which is received, calculated, processed and converted into the information datum in regard to the gas detection by the processor control circuit unit, and the information datum is outputted through the at least one first external connection port to the driving and controlling circuit, processed and converted into the actuation information datum for externally outputting through the at least one second external connection port, and the actuation information datum outputted from the at least one second external connection port is received by the cleaning device to actuate or close the cleaning device.

3. The gas detection and cleaning system for the vehicle according to claim 2, wherein the gas detection main body comprises:

the base comprising:

the gas-guiding-component loading region having four positioning protrusions disposed at four corners thereof; and an outer cover covering the first surface of the base and comprising a side plate, wherein the side plate has an inlet opening spatially corresponding to the gas-inlet and an outlet opening spatially corresponding to the gas-outlet respectively, wherein the first surface of the base is covered with the outer cover, and the second surface of the base is covered with the driving circuit board, so that an gas-inlet path is defined by the gas-inlet groove, and an gas-outlet path is defined by the gas-outlet groove, wherein the gas is inhaled from the environment outside the base by the piezoelectric actuator, transported into the gas-inlet path defined by the gas-inlet groove through the inlet opening, and passes through the particulate sensor to detect the concentration of the suspended particles contained in the gas, and the gas transported through the piezoelectric actuator is transported out of the gas-outlet path defined by the gas-outlet groove through the ventilation hole and then discharged through the outlet opening.

4. The gas detection and cleaning system for the vehicle according to claim 3, wherein the base comprises a light trapping region hollowed out from the first surface to the second surface and spatially corresponding to the laser loading region, wherein the light trapping region comprises a light trapping structure having an oblique cone surface and spatially corresponding to the light beam path.

5. The gas detection and cleaning system for the vehicle according to claim 4, wherein a light trapping distance is maintained between the transparent window and a position where the light trapping structure receives the projecting light beam.

6. The gas detection and cleaning system for the vehicle according to claim 5, wherein the light trapping distance is greater than 3 mm.

7. The gas detection and cleaning system for the vehicle according to claim 3, wherein the particulate sensor is a PM2.5 sensor.

8. The gas detection and cleaning system for the vehicle according to claim 3, wherein the piezoelectric actuator comprises:
   a gas-injection plate comprising a suspension plate and a hollow aperture, wherein the suspension plate is permitted to undergo a bending deformation, and the hollow aperture is formed at a center of the suspension plate;
   a chamber frame carried and stacked on the suspension plate;
   an actuator element carried and stacked on the chamber frame for being driven in response to a driving voltage to undergo the bending deformation in a reciprocating manner;
   an insulation frame carried and stacked on the actuator element; and
   a conductive frame carried and stacked on the insulation frame,
   wherein the gas-injection plate is supported and positioned on the four positioning protrusions of the gas-guiding-component loading region, so that the gas-injection plate and an inner edge of the gas-guiding-component loading region define a clearance for gas to flow through, a flowing chamber is formed between the gas-injection plate and the bottom surface of the gas-guiding-component loading region, a resonance chamber is formed between the actuator element, the chamber frame and the suspension plate, wherein when the actuator element is enabled to drive the gas-injection plate to move in resonance, the suspension plate of the gas-injection plate is driven to generate the bending deformation in a reciprocating manner, and the gas is inhaled through the clearance, flowing into the flowing chamber, and discharged out, so as to achieve gas transportation.

9. The gas detection and cleaning system for the vehicle according to claim 8, wherein the actuator element comprises:
   a piezoelectric carrying plate carried and stacked on the chamber frame;
   an adjusting resonance plate carried and stacked on the piezoelectric carrying plate; and
   a piezoelectric plate carried and stacked on the adjusting resonance plate, wherein the piezoelectric plate is configured to drive the piezoelectric carrying plate and the adjusting resonance plate by the driving voltage and generate the bending deformation in the reciprocating manner.

10. The gas detection and cleaning system for the vehicle according to claim 3, further comprising a first volatile-organic-compound sensor positioned and disposed on the driving circuit board, electrically connected to the driving circuit board, and accommodated in the gas-outlet groove, so as to detect the gas flowing through the gas-outlet path.

11. The gas detection and cleaning system for the vehicle according to claim 4, further comprising a second volatile-organic-compound sensor positioned and disposed on the driving circuit board, electrically connected to the driving circuit board, and accommodated in the light trapping region, so as to detect the gas flowing through the gas-inlet path of the gas-inlet groove and transported into the light trapping region through the transparent window.

12. The gas detection and cleaning system for the vehicle according to claim 1, wherein the at least one first external connection port is a USB communication transmission port.

13. The gas detection and cleaning system for the vehicle according to claim 1, wherein the at least one second external connection port is a USB communication transmission port.

* * * * *